United States Patent
Muto et al.

(10) Patent No.: US 11,390,568 B2
(45) Date of Patent: Jul. 19, 2022

(54) CERAMIC COMPOSITE AND PRODUCTION METHOD FOR CERAMIC COMPOSITE

(71) Applicant: ADAMANT NAMIKI PRECISION JEWEL CO., LTD., Tokyo (JP)

(72) Inventors: Hikaru Muto, Kawaguchi (JP); Yusuke Akiyama, Kawaguchi (JP); Shinichi Takeda, Tokyo (JP); Shunsuke Karashima, Ageo (JP); Shunpei Amano, Kawaguchi (JP)

(73) Assignee: ADAMANT NAMIKI PRECISION JEWEL CO., LTD., Tokyo (JP)

( * ) Notice: Subject to any disclaimer, the term of this patent is extended or adjusted under 35 U.S.C. 154(b) by 854 days.

(21) Appl. No.: 16/312,083

(22) PCT Filed: Jun. 20, 2017

(86) PCT No.: PCT/JP2017/022695
§ 371 (c)(1),
(2) Date: Dec. 20, 2018

(87) PCT Pub. No.: WO2017/221932
PCT Pub. Date: Dec. 28, 2017

(65) Prior Publication Data
US 2019/0225554 A1    Jul. 25, 2019

(30) Foreign Application Priority Data

Jun. 23, 2016   (JP) .............................. JP2016-124299

(51) Int. Cl.
| | | |
|---|---|---|
| *C04B 41/83* | (2006.01) | |
| *C04B 38/00* | (2006.01) | |
| *C08K 3/36* | (2006.01) | |
| *C08K 3/22* | (2006.01) | |
| *C08L 33/12* | (2006.01) | |
| *C08L 101/00* | (2006.01) | |
| *C08L 29/04* | (2006.01) | |
| *C04B 41/48* | (2006.01) | |
| *H05K 1/03* | (2006.01) | |
| *A61C 13/083* | (2006.01) | |

(52) U.S. Cl.
CPC .............. *C04B 41/83* (2013.01); *C04B 38/00* (2013.01); *C04B 41/483* (2013.01); *C04B 41/4869* (2013.01); *C08K 3/22* (2013.01); *C08K 3/36* (2013.01); *C08L 29/04* (2013.01); *C08L 33/12* (2013.01); *C08L 101/00* (2013.01); *H05K 1/0306* (2013.01); *A61C 13/083* (2013.01); *H01L 2924/09701* (2013.01)

(58) Field of Classification Search
None
See application file for complete search history.

(56) References Cited

U.S. PATENT DOCUMENTS

| | | |
|---|---|---|
| 4,882,455 A | 11/1989 | Sato et al. |
| 2003/0214793 A1 | 11/2003 | Uchida et al. |
| 2004/0043051 A1 | 3/2004 | Pilliar et al. |
| 2009/0035738 A1 | 2/2009 | Kadobayashi |
| 2011/0229858 A1 | 9/2011 | Sadoun |
| 2017/0151604 A1* | 6/2017 | Digard Brou De Cuissart ........... B28B 11/04 |

FOREIGN PATENT DOCUMENTS

| | | |
|---|---|---|
| EP | 0393525 A2 | 10/1990 |
| JP | S61-281088 A | 12/1986 |
| JP | S62-26886 A | 2/1987 |
| JP | 2001-279106 A | 10/2001 |
| JP | 2004-297020 A | 10/2004 |
| JP | 2009-053659 A | 3/2009 |
| JP | 2012-501783 A | 1/2012 |

OTHER PUBLICATIONS

Machine translation of JP 2001-279106 Hayashi et al. (Year: 2001).*
Guo et al. (Adv. Funct. Mater 2016, 26, 7115-7121) (Year: 2016).*
Europe Patent Office, "Search Report for European Patent Application No. 17815400.1," Nov. 21, 2019.
PCT/ISA/210, "International Search Report for International Application No. PCT/JP2017/022695" dated Sep. 26, 2017.

* cited by examiner

*Primary Examiner* — Robert T Butcher
(74) *Attorney, Agent, or Firm* — Manabu Kanesaka

(57) ABSTRACT

To provide a ceramic composite and a production method therefor allowing ease of processing to be improved and fracture toughness to be improved simultaneously. The invention includes the steps of: preparing at least a liquid-form resin and a ceramic sintered body which has been sintered at a temperature which is 700° C. to 100° C. less than a sintering temperature at which a theoretical density is obtained; immersing the ceramic sintered body in the liquid-form resin, causing the liquid-form resin to infiltrate the ceramic sintered body; and hardening the infiltrated liquid-form resin to obtain a ceramic composite having a relative density of between 40% and 90% by causing the resin to infiltrate. Gaps where no resin has infiltrated are formed in the ceramic composite.

8 Claims, 4 Drawing Sheets

CERAMIC COMPOSITE AND PRODUCTION METHOD FOR CERAMIC COMPOSITE

RELATED APPLICATIONS

The present application is National Phase of International Application No. PCT/JP2017/022695 filed Jun. 20, 2017, and claims priority from Japanese Application No. 2016-124299, Jun. 23, 2016, the disclosure of which is hereby incorporated by reference herein in its entirety.

TECHNICAL FIELD

The present invention relates to a ceramic composite and a production method for the ceramic composite.

BACKGROUND ART

In recent years, composite materials of ceramics and resins have attracted attention in fields where mechanical properties such as light weight, high toughness, high rigidity (high Young's modulus), high strength, and the like, are required. The composite materials that are put into practical use at present are composite materials of ceramic fibers and resins, called fiber reinforced plastics (FRP) or carbon fiber reinforced plastics (CFRP), and are used as mechanical components and structural materials.

As a production method for the composite material, there is a method of producing a composite material by making a ceramic fiber into a thin cloth, applying a resin to the ceramic fiber or dipping the ceramic fiber in the resin, stacking the ceramic fibers in several layers, followed by thermal hardening while pressing the layers, and machining. Alternatively, a process of placing the ceramic fibers in a mold and applying the resin thereon is repeated in sequence to form a shape of a product, and then the resin is hardened at room temperature or by heating, thereby producing the composite material.

However, these production methods have problems in that it is not possible to produce complicated shaped products and perform mass production, and it is difficult to achieve cost reduction. In addition, since ceramics are in the form of fibers, characteristics of products are not uniform, and thus there are problems in that deviations occur, and simultaneously the content of ceramics cannot be increased.

Therefore, as a production method for solving these problems, for example, Patent Literature 1 is disclosed. Patent Literature 1 discloses a production method for a composite material of ceramics and a resin characterized by immersing a ceramic porous body having a relative density of 40% or more in a liquid resin, infiltrating the liquid resin into the ceramic porous body by vacuum treatment, and hardening the infiltrated resin.

CITATION LIST

Patent Literature

Patent Literature 1: JP 2001-279106 A

SUMMARY OF INVENTION

Technical Problem

An example of applications of a composite material of ceramics and resins may include, particularly, dental application. In the dental application, accurate molding processability is required for each tooth form of a patient from the viewpoint of engagement and the like. For the molding processability, ease of processing and high precision molding are required. Furthermore, high precision molding requires to prevent cracking or chipping, and thus high fracture toughness is required.

However, if it is attempted to realize high fracture toughness, resistance to fracture when a mechanical load is applied increases, and thus the ease of processing against external force is deteriorated. Therefore, it is difficult to achieve both high fracture toughness and improvement of ease of processing which are antinomic problems, and even in the production method described in Patent Literature 1, it was not possible to achieve both improvement of ease of processing and improvement of fracture toughness of the composite material of ceramics and resins.

The present invention has been made in view of the above-described problems, and it is an object of the present invention to provide a ceramic composite and a production method therefor capable of achieving both improvement of ease of processing and improvement of fracture toughness at the same time.

Solution to Problem

This problem is solved by the following invention. That is, the ceramic composite of the present invention is characterized in that a resin is infiltrated into a ceramic sintered body to have a relative density of 40% or more and 90% or less.

Further, a production method for a ceramic composite of the present invention is characterized by including preparing at least a ceramic sintered body and a liquid resin, the ceramic sintered body obtained by being sintered at a temperature −700° C. or more and −100° C. or less lower than a sintering temperature at which a theoretical density is obtainable, immersing the ceramic sintered body in the liquid resin, infiltrating the liquid resin into the ceramic sintered body, solidifying the infiltrated liquid resin to obtain a ceramic composite having a relative density of 40% or more and 90% or less by infiltrating the resin.

Advantageous Effects of Invention

According to the ceramic composite or the production method for the ceramic composite of the present invention, the ceramic composite having a relative density of 40% or more and 90% or less is produced by infiltrating a resin into a ceramic sintered body which has gaps formed by being sintered at a temperature −700° C. or more and −100° C. or less lower than a sintering temperature at which a theoretical density is obtainable, thereby making it possible to improve fracture toughness of the ceramic composite.

At the same time, by intentionally leaving gaps where the resin is not infiltrated, it is possible to suppress excessive increase in fracture toughness while providing pores. Therefore, resistance to fracture when a mechanical load is applied does not become excessive, and thus ease of processing against external force is improved. Therefore, it is also possible to improve the ease of processing of the ceramic composite, and thus the ceramic composite can be very thinly and precisely formed and processed.

Further, improvement of the fracture toughness to a desired value can be realized by infiltrating a predetermined amount of resin into a ceramic sintered body formed with a predetermined material and volume, and thus there is no need to infiltrate a larger amount of the resin. Therefore, by intentionally leaving gaps where the resin is not infiltrated, it is possible to achieve both improvement of fracture toughness and improvement of ease of processing.

Further, by infiltrating either polyvinyl alcohol or a polymethyl methacrylate resin as the resin and simultaneously leaving gaps where the resin is not infiltrated, the relative density is determined to be 45% or more and 60% or less, thereby making it possible to realize a ceramic composite capable of performing a very thin and precise forming process with a thickness of 0.04 mm or more and 0.06 mm or less, and capable of improving fracture toughness to a range of more than 0.11 MPam$^{1/2}$ and less than 0.21 MPam$^{1/2}$.

Further, it is possible to realize the ceramic composite having both the fracture toughness and ease of processing optimum for dental application by including any one of silica, alumina, zirconia, hydroxyapatite, and β-tricalcium phosphate as the ceramic material into which the resin is infiltrated.

DESCRIPTION OF EMBODIMENTS

Figure 1:
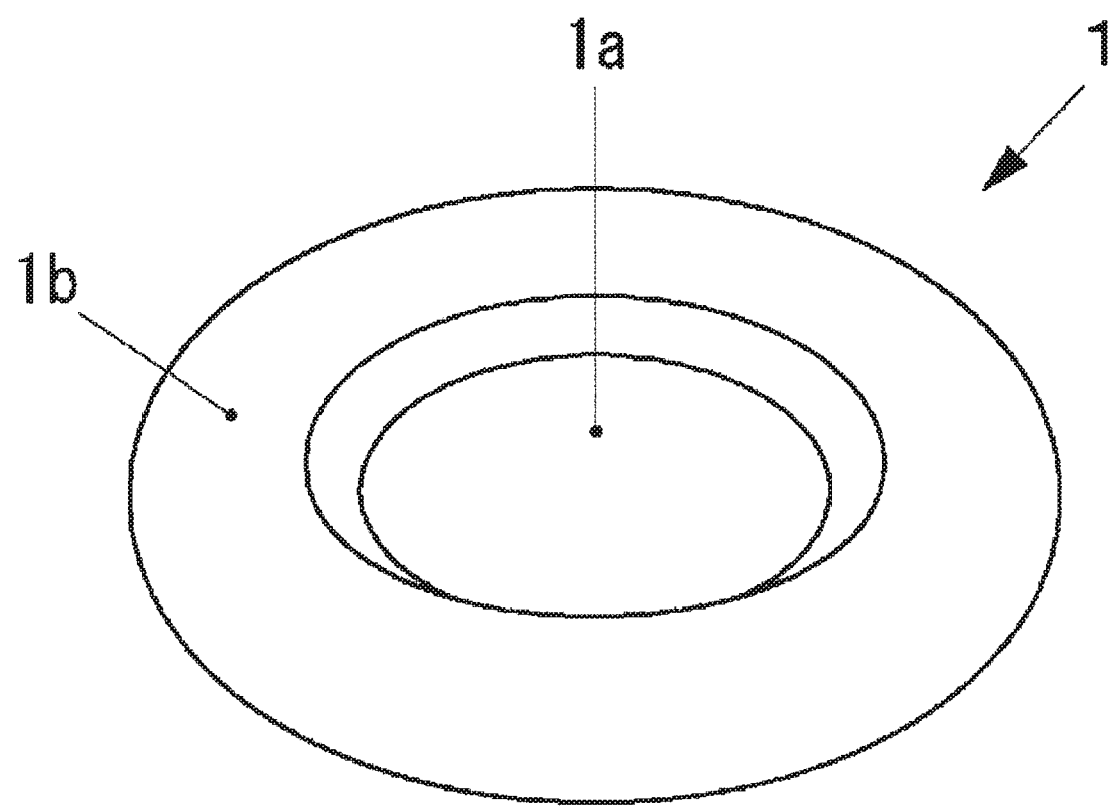
FIG. 1 is a perspective view of a test piece produced with a ceramic composite according to an embodiment and an example of the present invention.

A first characteristic of the present embodiment is a ceramic composite in which a resin is infiltrated into a ceramic sintered body to have a relative density of 40% or more and 90% or less.

Further, a second characteristic is a production method for a ceramic composite including preparing at least a ceramic sintered body and a liquid resin, the ceramic sintered body obtained by being sintered at a temperature −700° C. or more and −100° C. or less lower than a sintering temperature at which a theoretical density is obtainable, immersing the ceramic sintered body in the liquid resin, infiltrating the liquid resin into the ceramic sintered body, solidifying the infiltrated liquid resin to obtain a ceramic composite having a relative density of 40% or more and 90% or less by infiltrating the resin.

Further, a third characteristic is to form gaps where the resin is not infiltrated, in the ceramic composite.

According to the ceramic composite and the production method for the ceramic composite, the fracture toughness of the ceramic composite can be improved. At the same time, by intentionally leaving gaps where the resin is not infiltrated, it is possible to suppress excessive increase in fracture toughness while providing pores. Therefore, resistance to fracture when a mechanical load is applied does not become excessive, and thus ease of processing against external force is improved. Therefore, it is also possible to improve the ease of processing of the ceramic composite, and thus the ceramic composite can be very thinly and precisely formed and processed.

Further, improvement of the fracture toughness to a desired value can be realized by infiltrating a predetermined amount of resin into a ceramic sintered body formed with a predetermined material and volume, and thus there is no need to infiltrate a larger amount of the resin. Therefore, by intentionally leaving gaps where the resin is not infiltrated, it is possible to achieve both improvement of fracture toughness and improvement of ease of processing.

In the present invention, the relative density is a relative density with respect to the theoretical density exhibited by the ceramic sintered body produced with a desired ceramic raw material.

In addition, sintering in the present invention refers to a step of producing a solid body (a solid body made of ceramics) from the ceramic raw material, and also includes a conventionally used firing, pre-firing or pre-sintering. Further, the ceramic sintered body is a solid body made of ceramics produced by sintering in the present invention, and also includes a ceramic fired body, a ceramic pre-fired body or a ceramic pre-sintered body.

In the present invention, the sintering temperature at which the theoretical density can be obtained refers to a sintering temperature at which a ceramic sintered body produced with the desired ceramic raw material can obtain a theoretical density. Specifically, the sintering temperature refers to a sintering temperature at the time of forming a ceramic sintered body capable of obtaining respective theoretical densities: silica: 2.20 g/cm$^3$, alumina: 3.99 g/cm$^3$, zirconia: 6.07 g/cm$^3$, hydroxyapatite: 3.16 g/cm$^3$, and β-TCP: 3.07 g/cm$^3$.

A fourth characteristic is that the relative density of the ceramic composite is 45% or more and 60% or less.

A fifth characteristic is that the thinnest part of the ceramic composite has a thickness of 0.04 mm or more and 0.06 mm or less.

A sixth characteristic is that a fracture toughness of the ceramic composite is more than 0.11 MPam$^{1/2}$ and less than 0.21 MPam$^{1/2}$.

A seventh characteristic is that the resin to be infiltrated is either polyvinyl alcohol or a polymethyl methacrylate resin. By infiltrating either polyvinyl alcohol or a polymethyl methacrylate resin into the ceramic sintered body which is obtained by being sintered at a temperature −700° C. or more and −100° C. or less lower than a sintering temperature at which a theoretical density is obtainable and simultaneously leaving gaps where the resin is not infiltrated, the relative density is determined to be 45% or more and 60% or less, thereby making it possible to realize a ceramic composite capable of performing a very thin and precise forming process with a thickness of 0.04 mm or more and 0.06 mm or less, and capable of improving fracture toughness to a range of more than 0.11 MPam$^{1/2}$ and less than 0.21 MPam$^{1/2}$.

A eighth characteristic is that the ceramic material forming the ceramic sintered body is any one of silica, alumina, zirconia, hydroxyapatite, and β-tricalcium phosphate. Therefore, it is possible to realize a ceramic composite having both fracture toughness and ease of processing, which is optimum for dental application.

Hereinafter, referring to FIG. 1 to FIG. 3 as appropriate, a ceramic composite and a production method thereof according to an embodiment of the present invention are described. The ceramic composite of the present embodiment is a ceramic composite in which a resin is infiltrated into a ceramic sintered body produced with a desired ceramic raw material to have a relative density of 40% or more and 90% or less.

Since the ceramic composite has a relative density of 40% or more and 90% or less, a plurality of gaps are formed with a relative density of less than 10% or less than 40% in the ceramic composite of the present embodiment.

In order to infiltrate the resin into the ceramic sintered body, the ceramic sintered body as a porous body having a plurality of gaps is prepared in advance. Only from the viewpoint of improving the fracture toughness when the resin is infiltrated into the sintered ceramic body, it is preferable to infiltrate the resin as much as possible so as to fill all the gaps formed in the ceramic sintered body. However, in the ceramic composite of the present embodiment, it is characterized in that the relative density is 40% or more and 90% or less after infiltrating the resin into the ceramic sintered body, and thus gaps where the resin is not infiltrated are rather formed.

By infiltrating the resin into the ceramic sintered body, the resin is infiltrated and filled into the gaps, and thus it is possible to improve the fracture toughness. At the same time, by intentionally leaving gaps where the resin is not infiltrated, it is possible to suppress excessive increase in fracture toughness while providing pores. Therefore, resistance to fracture when a mechanical load is applied does not become excessive, and thus ease of processing against external force is improved. Accordingly, it is also possible to improve the ease of processing of the ceramic composite while realizing a desired value of fracture toughness, and thus the ceramic composite can be very thinly and precisely formed and processed.

Further, improvement of the fracture toughness to a desired value can be realized by infiltrating a predetermined amount of resin into a ceramic sintered body formed with a predetermined material and a predetermined volume, and thus there is no need to infiltrate a larger amount of the resin. Therefore, by intentionally leaving gaps where the resin is not infiltrated, it is possible to achieve both improvement of fracture toughness and improvement of ease of processing.

If the relative density of the ceramic composite is less than 40%, the gaps become excessively large, and thus it is not possible to secure the fracture toughness value required for the ceramic composite for dental application. On the other hand, when the relative density exceeds 90%, the gaps become excessively small, and thus the ease of processing against external force decreases.

In particular, when the ceramic composite is used for dental application, it is possible to produce the ceramic composite considering that the higher fracture toughness is better from the viewpoint of high precision molding. However, the present applicant found after verifying the experiment that the gaps could be provided while realizing the fracture toughness value at which high precision molding was obtainable. It seemed that the fracture toughness would be reduced if the gaps where the resin is not infiltrated are left in the ceramic composite. However, as a result of verifying the experiment, it was found that as compared with the ceramic sintered body in which the resin is not infiltrated, it was possible to achieve both improvement of fracture toughness and improvement of ease of processing at the same time.

Further, it is more preferable to set the relative density to be 45% or more and 60% or less from the viewpoint of high achievement in improving both the fracture toughness and the ease of processing as the ceramic composite for dental application.

The present applicant found from application investigation and verification that as specific numerical values from the viewpoint of higher achievement in both improvements as the ceramic composite for dental application, it is preferable to ensure a range of 0.04 mm or more and 0.06 mm or less as the thickness of the thinnest part for the ease of processing and a range of more than 0.11 $MPam^{1/2}$ and less than 0.21 $MPam^{1/2}$ as the fracture toughness.

Even in a case where it is possible to ensure the fracture toughness in the range of more than 0.11 $MPam^{1/2}$ and less than 0.21 $MPam^{1/2}$, it is not possible to perform a forming process with a thickness less than 0.04 mm. On the other hand, when the thickness exceeds 0.06 mm, it is difficult to perform a fine forming process due to the increased thickness.

When the fracture toughness is 0.11 $MPam^{1/2}$ or less, it is not possible to perform high precision forming as a ceramic composite for dental application. On the other hand, when the fracture toughness is 0.21 $MPam^{1/2}$ or more, it is preferable only from the viewpoint of the improvement of fracture toughness, but resistance to fracture when a mechanical load is applied increases, and thus the ease of processing against external force is deteriorated.

In order to secure the above fracture toughness and ease of processing, in the present embodiment, the resin to be infiltrated is either polyvinyl alcohol (PVA) or a polymethyl methacrylate (PMMA) resin. By infiltrating either PVA or PMMA into the ceramic sintered body while simultaneously leaving gaps where the resin is not infiltrated, it is possible to realize the ceramic composite in which the fracture toughness is improved to a range of more than 0.11 $MPam^{1/2}$ and less than 0.21 $MPam^{1/2}$ while simultaneously achieving very thin and precise forming process of 0.04 mm or more and 0.06 mm or less.

In addition, the ceramic material forming the ceramic sintered body is any one of silica, alumina, zirconia, hydroxyapatite, and β-tricalciumphosphate (β-TCP). Therefore, it is possible to achieve a ceramic composite having both fracture toughness and ease of processing, which is optimum for dental application.

The production method for a ceramic composite body according to the present embodiment is described below. First, a desired ceramic raw material is prepared. The ceramic raw material to be used is any one of silica, alumina, zirconia, hydroxyapatite, and β-TCP. This ceramic raw material may be prepared in the form of powder or the like.

The ceramic raw material is molded and the molded ceramic raw material is sintered at a temperature −700° C. or more and −100° C. or less lower than a sintering temperature at which a theoretical density is obtainable, thereby preparing a ceramic sintered body composed of a porous body having a plurality of gaps.

Further, the sintering temperature at which the theoretical density can be obtained refers to a sintering temperature at which a ceramic sintered body produced with the desired ceramic raw material can obtain a theoretical density. Specifically, the sintering temperature refers to a sintering temperature at the time of forming a ceramic sintered body capable of obtaining respective theoretical densities: silica: 2.20 $g/cm^3$, alumina: 3.99 $g/cm^3$, zirconia: 6.07 $g/cm^3$, hydroxyapatite: 3.16 $g/cm^3$, and β-TCP: 3.07 $g/cm^3$. The molded ceramic raw material is sintered at a temperature −700° C. or more and −100° C. or less lower than the sintering temperature.

An example of the sintering temperature of each ceramic sintered body in which the theoretical density is obtainable is as follows. The sintering temperature of silica is 1400° C., the sintering temperature of alumina is 1550° C., the sintering temperature of zirconia is 1450° C., the sintering temperature of hydroxyapatite is 1300° C., and the sintering temperature of β-TCP is 1300° C.

The sintering temperature of the ceramic sintered body (porous body) prepared before infiltrating the resin depends on the kind and particle size of the ceramic raw material, but it is preferable that the sintering temperature is equal to or lower than a temperature at which pores of the porous body are not clogged even if sintering progresses, and it is preferable that a specific numerical range is 850° C. or more and 1050° C. or less. The atmosphere to be sintered may be in air or a non-oxidizing atmosphere including nitrogen, rare gas such as argon, or the like.

As the production method for the porous body, powder of the ceramic raw material may be molded and sintered as described above, or an inorganic binder may be added to the powder of the ceramic raw material, followed by molding and sintering.

Further, a liquid resin is prepared. The kind of resin to be infiltrated into the ceramic sintered body may be appropriately selected, but PVA or PMMA is preferable for dental application as described above. The resin is mixed or dissolved by stirring with water or an organic solvent to prepare the liquid resin. As the liquid resin, most liquid resins such as resins dissolved or dispersed in water, resins dissolved in an organic solvent, resins which are liquid even if the resins are not dissolved, and the like, can be used. However, it is preferable that volume shrinkage during solidification is small. Further, in the liquid resin having a large volatile content, the resin infiltrated into the gaps of the porous body shrinks largely, and thus there is a possibility of leaving pores.

Next, the previously sintered ceramic sintered body is put in a vacuum apparatus and evacuated to be placed in a vacuum atmosphere, and a predetermined amount of the liquid resin is dropped on the ceramic sintered body, etc., thereby immersing the ceramic sintered body in the liquid resin. When the entire ceramic sintered body is immersed in the liquid resin, deaeration is further performed to infiltrate the resin into the gaps of the inside of the ceramic sintered body under the vacuum atmosphere. The degree of vacuum is a degree of vacuum attainable with a rotary pump.

Next, if necessary, the ceramic sintered body and the liquid resin are subjected to pressure treatment to perform further infiltration. The pressure treatment can be performed by using a desired method. For example, the ceramic sintered body and the liquid resin are placed in a vacuum pack and pressed by a cold isostatic pressing (CIP) treatment to infiltrate the liquid resin into the ceramic sintered body. Several atmospheric pressures are sufficient for the pressure to be applied, and it is acceptable for the pressure to be higher than the several atmospheric pressures.

After infiltrating the liquid resin into the ceramic sintered body, the ceramic sintered body is taken out, the liquid is drained off, and the extra resin on the surface is wiped off with a cloth or the like or is removed by washing lightly with water. The ceramic sintered body is heated and dried to remove moisture and solidify the resin infiltrated into the gaps, thereby forming the ceramic composite according to the present embodiment. It is sufficient to hold the heating time for about 10 minutes to 240 minutes, and it does not matter that the heating time is long.

As described above, in the ceramic composite according to the present invention, it is eventually possible to allow the gaps to remain by deriving the numerical range of the fracture toughness value which is neither excessive nor deficient for the ceramic composite for dental application (particularly by deriving the upper limit value), thereby realizing the improvement of ease of processing. Therefore, improvement of both the fracture toughness and ease of processing which are antinomic problems can be achieved with satisfactory numerical value ranges (the fracture toughness value of more than 0.11 $MPam^{1/2}$ and less than 0.21 $MPam^{1/2}$ and the thickness of the thinnest part being 0.04 mm or more and 0.06 mm or less) for the ceramic composite for dental application.

Figure 2A:
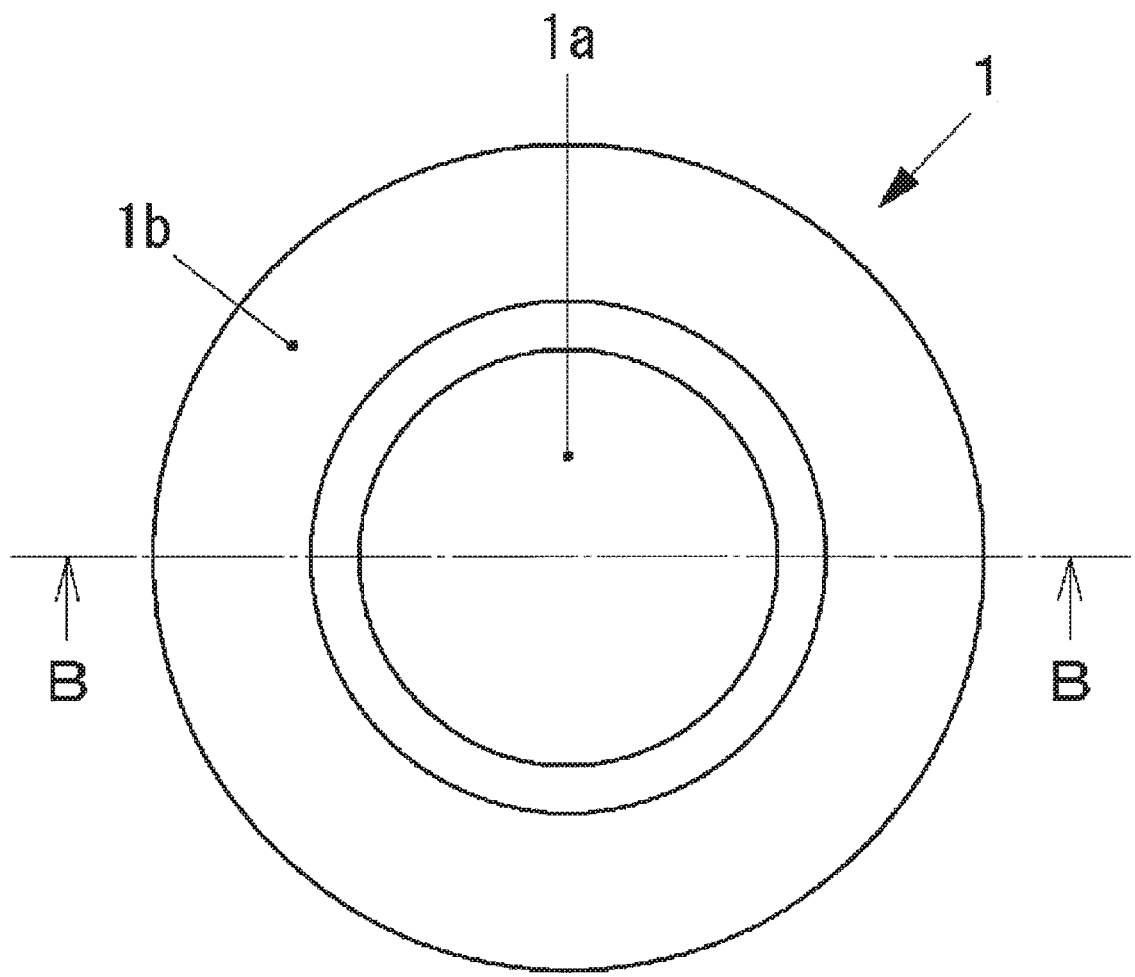
FIG. 2A is a plan view of the test piece of FIG. 1.
Figure 2B:
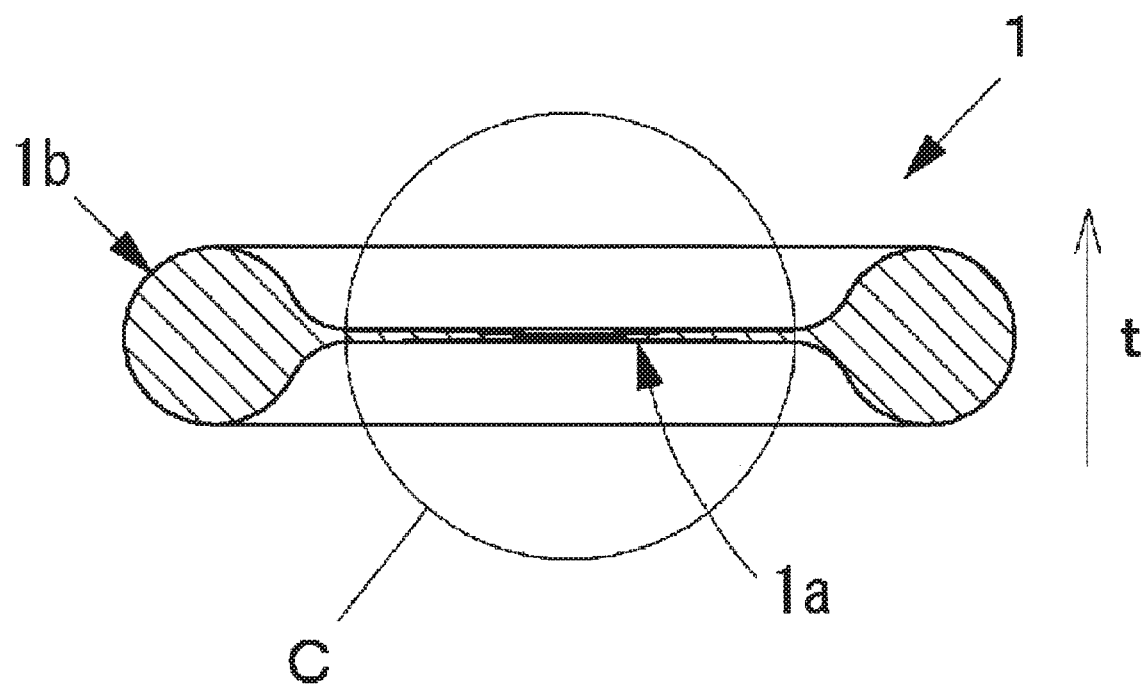
FIG. 2B is a cross-sectional view of the test piece in FIG. 2A, taken along line B-B.
Figure 3:
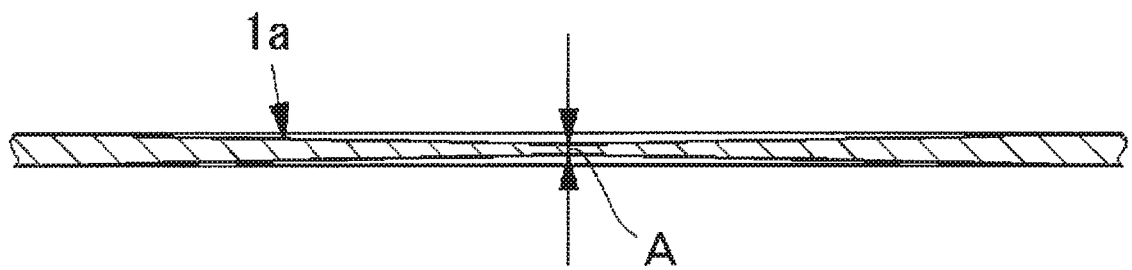
FIG. 3 is a partially enlarged view of a circle C in FIG. 2B.

The ceramic composite body may be processed with a CAD/CAM apparatus, for example, to prepare Test Piece 1 as shown in FIGS. 1 to 3. Test Piece 1 shown in FIGS. 1 to 3 is an object having a circular plane, which is composed of a central part 1a and a peripheral part 1b. When thicknesses of the central part 1a and that of the peripheral part 1b are compared, the thickness of the central part 1a is thinner in a thickness direction t of Test Piece 1 as shown in FIG. 2B, and even in the central part 1a, the central part is formed to be the thinnest, thereby forming the thinnest part A as shown in FIG. 3. In the ceramic composite of the present embodiment, it is possible to form the thinnest part A as thin as 0.04 mm or more and 0.06 mm or less.

A separate wedge-shaped Test Piece was also prepared, and an amount of chipping (mm) at the tip of the wedge was also measured. As a result, it was confirmed that the amount of chipping was reduced as compared with Test Piece having the same shape in which the resin was not infiltrated.

Example

An Example of the present invention is described below, but the present invention is not limited only to the following Example.

In the present Example, zirconia ($ZrO_2$) powder (particle size of 0.06 μm) was prepared as a ceramic raw material. Then, the ceramic raw material was molded and sintered at a temperature 450° C. lower than a sintering temperature at which a theoretical density is obtainable (1000° C.), thereby preparing a ceramic sintered body composed of a porous body having a plurality of gaps.

PVA and PMMA were prepared as the resin to be infiltrated into the ceramic sintered body. Each resin was dissolved by stirring with water to prepare a liquid resin.

Next, the previously sintered ceramic sintered body was put in a vacuum apparatus and evacuated to be placed in a vacuum atmosphere, and a predetermined amount of the liquid resin (see "Resin amount (vol %)" in Table 1) was dropped on the ceramic sintered body, etc., thereby immersing the ceramic sintered body in the liquid resin. When the entire ceramic sintered body was immersed in the liquid resin, deaeration was further performed to infiltrate the resin into the gaps of the inside of the ceramic sintered body under the vacuum atmosphere.

Next, the ceramic sintered body and the liquid resin were subjected to a CIP treatment as a pressure treatment to perform further infiltration. Specifically, the ceramic sintered body and the liquid resin were placed in a vacuum pack, the vacuum pack was submerged in water, and isotropic pressure was applied to the vacuum pack by CIP treatment in water.

After infiltrating the liquid resin into the ceramic sintered body, the ceramic sintered body was taken out and the extra resin on the surface was removed by washing with water. Then, the ceramic sintered body was dried by heating at 70° C. to remove moisture and to solidify the resin infiltrated into the gaps, thereby forming a ceramic composite.

The ceramic composite was processed with a CAD/CAM apparatus, and five kinds of Test Pieces 1 shown in FIGS. 1 to 3 were produced according to the type of resin and the amount of resin to be infiltrated (vol %). In all cases, the relative densities were 53.7%. Whether or not the thinnest part A (mm) of Test Piece 1 was formed, the thickness of the thinnest part A (mm) in the case where the thinnest part A was formable and the fracture toughness (MPam$^{1/2}$) of each Test Piece 1 were measured. Results thereof are shown in Table 1. The sample described as Resin PVA or PMMA in Table 1 is Example. In addition, as a measurement method for fracture toughness, JIS T6526: 2012 was applied.

TABLE 1

| Firing Temperature (° C.) | Resin | Resin Amount (Vol %) | Fracture Toughness (MPam$^{1/2}$) | Thinnest Part A (mm) | | | |
|---|---|---|---|---|---|---|---|
| | | | | 0.08 | 0.07 | 0.06 | 0.04 |
| 1000 | None | — | 0.11 | ○ | ○ | X | X |
| | PVA | 4.0 | 0.13 | ○ | ○ | X | X |
| | | 8.9 | 0.15 | ○ | ○ | ○ | Δ |
| | | 19.8 | 0.13 | ○ | ○ | X | X |
| | PMMA | 10.0 | 0.12 | ○ | ○ | X | X |
| | | 15.7 | 0.12 | ○ | ○ | ○ | X |

As a result of measuring and observing each Test Piece, as the fracture toughness, measurement values of more than 0.11 MPam$^{1/2}$ and less than 0.21 MPam$^{1/2}$ could be obtained with PVA and PMMA each at the infiltration amount of 4.0 to 19.8 (vol %).

Further, it was observed that the thinnest part A with 0.06 (mm) could be formed with PVA and PMMA at the infiltration amount of 8.9 to 15.7 (vol %) (in Table 1, "○" indicates that the thinnest part can be formed in all samples with each resin at each infiltration amount, and "X" indicates observation results in which the thinnest part cannot be formed in all samples).

Further, it was observed that the thinnest part A of 0.04 (mm) could be formed with a ceramic composite in which the PVA was infiltrated at an infiltration amount of 8.9 (vol %) (in Table 1, "Δ" indicates that the thinnest part can be formed in some samples).

Comparative Example

Next, Comparative Example is described. The difference between Comparative Example and Example above is that a ceramic sintered body composed of a porous body was prepared without infiltrating the resin, and Test Piece 1 having the same shape was produced. Specifically, similarly to Example above, Test Piece 1 shown in FIGS. 1 to 3 was prepared by molding ZrO$_2$ powder, sintering at 1000° C. to prepare a ceramic sintered body composed of a porous body, and processing the ceramic sintered body with a CAD/CAM apparatus.

Whether or not the thinnest part A (mm) of Test Piece 1 was formed, the thickness of the thinnest part A (mm) in the case where the thinnest part A was formable, and the fracture toughness (MPam$^{1/2}$) of Test Piece 1 was measured. Results thereof are shown in Table 1.

As a result of measuring each Test Piece, it was confirmed that the fracture toughness value was measured as 0.11 MPam$^{1/2}$ or less, and thus it was not possible to achieve the fracture toughness exceeding 0.11 MPam$^{1/2}$ if the resin was not added.

In addition, it was confirmed that the thinnest part A with 0.07 (mm) and 0.08 (mm) could be formed but the thinnest part A with 0.04 (mm) and 0.06 (mm) could not be formed.

In Table 1, "○" indicates that the thinnest part can be formed in all samples, and "X" indicates observation results in which the thinnest part cannot be formed in all samples.

REFERENCE SIGNS LIST

1: Test Piece
1a: Central Part
1b: Peripheral Part
A: Thinnest Part of Central Part

The invention claimed is:

1. A ceramic composite for dental application comprising: a ceramic sintered body having a relative density of 45% or more and 60% or less, wherein a resin of either a polyvinyl alcohol resin or a polymethyl methacrylate resin is partly infiltrated into the ceramic sintered body leaving gaps that are not infiltrated, and the ceramic sintered body has a thickness of a thinnest part of 0.04 mm or more and 0.06 mm or less, and fracture toughness is more than 0.11 MPam$^{1/2}$ and less than 0.21 MPam$^{1/2}$.

2. The ceramic composite for dental application according to claim 1, wherein a ceramic material forming the ceramic sintered body is any one of silica, alumina, zirconia, hydroxyapatite, and β-tricalcium phosphate.

3. A production method for a ceramic composite for dental application comprising:
preparing at least a ceramic sintered body and a liquid resin of either a polyvinyl alcohol resin or a polymethyl methacrylate resin, the ceramic sintered body obtained by being sintered at a temperature −700° C. or more and −100° C. or less lower than a sintering temperature at which a theoretical density is obtainable,
immersing the ceramic sintered body in the liquid resin by a vacuum treatment,
infiltrating the liquid resin into the ceramic sintered body,
further infiltrating the liquid resin into the ceramic sintered body placing the ceramic sintered body and the liquid resin in a vacuum pack, submerging the vacuum pack in water, and applying isotropic pressure to the vacuum pack by a cold isostatic pressing (CIP) treatment, and
solidifying the infiltrated liquid resin to obtain a ceramic composite having a relative density of 45% or more and 60% or less by infiltrating the resin.

4. The production method according to claim 3, wherein gaps where the resin is not infiltrated are formed.

5. The production method according to claim 3, wherein the ceramic sintered body has a thickness of thinnest part of 0.04 mm or more and 0.06 mm or less.

6. The production method according to claim 3, wherein a ceramic material forming the ceramic sintered body is any one of silica, alumina, zirconia, hydroxyapatite, and β-tricalcium phosphate.

7. The ceramic composite for dental application according to claim 6, wherein the ceramic material is a powder having a particle size of 0.06 μm.

8. The ceramic composite for dental application according to claim 6, wherein the ceramic sintered body is formed to have theoretical densities of 2.20 g/cm$^3$ for silica, 3.99 g/cm$^3$ for alumina, 6.07 g/cm$^3$ for zirconia, 3.16 g/cm$^3$ for hydroxyapatite, and 3.07 g/cm$^3$ for β-tricalcium phosphate.

* * * * *